US012585481B2

(12) United States Patent
Kwak et al.

(10) Patent No.: US 12,585,481 B2
(45) Date of Patent: Mar. 24, 2026

(54) METHOD AND ELECTRONIC DEVICE FOR PERFORMING TRANSLATION

(71) Applicant: Samsung Electronics Co., Ltd., Suwon-si (KR)

(72) Inventors: Seongsin Kwak, Suwon-si (KR); Sungoh Kim, Suwon-si (KR); Insun Song, Suwon-si (KR); Dasom Lee, Suwon-si (KR); Kwangyong Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 18/482,440

(22) Filed: Oct. 6, 2023

(65) Prior Publication Data

US 2024/0045705 A1 Feb. 8, 2024

Related U.S. Application Data

(63) Continuation of application No. PCT/KR2022/005731, filed on Apr. 21, 2022.

(30) Foreign Application Priority Data

Apr. 21, 2021 (KR) ......................... 10-2021-0051632

(51) Int. Cl.
 *G06F 40/58* (2020.01)
 *G06F 9/451* (2018.01)
(52) U.S. Cl.
 CPC .............. *G06F 9/454* (2018.02); *G06F 40/58* (2020.01)
(58) Field of Classification Search
 CPC ........ G06F 40/58; G06F 40/30; G06F 40/166; G06F 40/263; G06F 9/454; G06F 16/30;
 (Continued)

(56) References Cited

U.S. PATENT DOCUMENTS 7,801,721 B2 9/2010 Rosart et al.
9,104,661 B1 8/2015 Evans
(Continued)

FOREIGN PATENT DOCUMENTS

JP 2006-127270 A 5/2006
JP 2012-133663 A 7/2012
(Continued)

OTHER PUBLICATIONS

International Search Report with Written Opinion and English translation dated Jul. 6, 2022; International Appln. No. PCT/KR2022/005731.

*Primary Examiner* — Olujimi A Adesanya
(74) *Attorney, Agent, or Firm* — Jefferson IP Law, LLP

(57) ABSTRACT

An electronic device is provided that includes a display and a processor that executes a first application based on a first language, displays a first execution screen corresponding to the first application, wherein a content, which changes over time, is displayed in a first area of the first execution screen, executes a second application in response to receiving a first user input, translates a text included in the first execution screen from the first language to a second language using the second application and displays the translation, in a state in which the second application is executed and in response to the content in the first area being changed, extracts the text included in the changed content, translates the extracted text from the first language to the second language using the second application, and displays a second execution screen corresponding to the first execution screen based on the second language.

16 Claims, 13 Drawing Sheets

(58) Field of Classification Search
CPC ........ G06F 3/0482; G06F 40/40; G06F 9/451;
G06F 40/47; G06F 40/284; G06F 40/289;
G06F 3/04842; G06F 3/0484; G06F
3/04817; G06F 16/3344
See application file for complete search history.

(56) References Cited

U.S. PATENT DOCUMENTS

| | | | |
|---|---|---|---|
| 9,349,077 B2 | 5/2016 | Capuozzo et al. | |
| 10,664,293 B2* | 5/2020 | Azulai | G06F 40/47 |
| 10,956,767 B2 | 3/2021 | Lee et al. | |
| 2003/0017841 A1 | 1/2003 | Bos et al. | |
| 2006/0294463 A1* | 12/2006 | Chu | G06F 9/454 |
| | | | 715/703 |
| 2007/0282594 A1 | 12/2007 | Spina | |
| 2011/0040552 A1 | 2/2011 | Van Guilder et al. | |
| 2014/0249797 A1 | 9/2014 | Liu et al. | |
| 2014/0281886 A1* | 9/2014 | Hirsch | G06F 40/143 |
| | | | 715/234 |
| 2015/0120274 A1* | 4/2015 | Forbush | G06F 40/58 |
| | | | 704/2 |
| 2015/0154181 A1 | 6/2015 | Dmytryshyn | |
| 2015/0317120 A1 | 11/2015 | Kim et al. | |
| 2017/0083512 A1* | 3/2017 | Bangarambandi | G06F 9/454 |
| 2017/0286406 A1 | 10/2017 | Kim et al. | |
| 2017/0351665 A1* | 12/2017 | Kim | H04M 1/72469 |
| 2018/0095950 A1* | 4/2018 | Phadke | G06F 40/205 |
| 2019/0065476 A1* | 2/2019 | Kwon | G06V 20/62 |
| 2020/0250208 A1 | 8/2020 | Lipka et al. | |
| 2020/0302126 A1* | 9/2020 | Malcangio | G10L 15/30 |
| 2021/0224491 A1* | 7/2021 | Kim | G06F 40/58 |
| 2021/0406481 A1* | 12/2021 | Spence | A63F 13/87 |

FOREIGN PATENT DOCUMENTS

| | | |
|---|---|---|
| JP | 5285827 B2 | 9/2013 |
| JP | 2014-16797 A | 1/2014 |
| JP | 2016-110446 A | 6/2016 |
| JP | 6458351 B2 | 1/2019 |
| JP | 2019-139629 A | 8/2019 |
| JP | 2019-149141 A | 9/2019 |
| JP | 2020-126649 A | 8/2020 |
| KR | 10-2001-0003382 A | 1/2001 |
| KR | 10-2012-0080721 A | 7/2012 |
| KR | 10-2015-0033027 A | 4/2015 |
| KR | 10-2015-0126193 A | 11/2015 |
| KR | 10-1769981 B1 | 8/2017 |
| KR | 10-2020-0036084 A | 4/2020 |
| KR | 10-2020-0064972 A | 6/2020 |
| WO | 2014/150407 A1 | 9/2014 |

\* cited by examiner

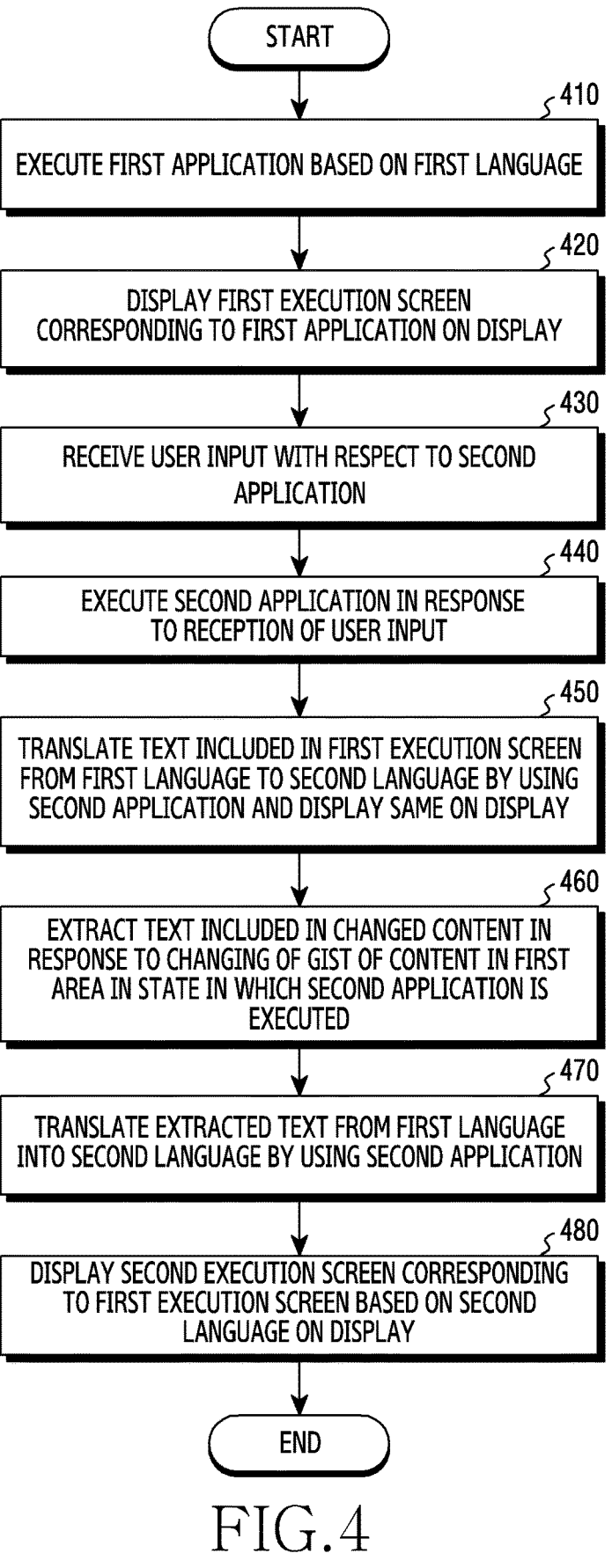

START

EXECUTE FIRST APPLICATION BASED ON FIRST LANGUAGE ~410

DISPLAY FIRST EXECUTION SCREEN CORRESPONDING TO FIRST APPLICATION ON DISPLAY ~420

RECEIVE USER INPUT WITH RESPECT TO SECOND APPLICATION ~430

EXECUTE SECOND APPLICATION IN RESPONSE TO RECEPTION OF USER INPUT ~440

TRANSLATE TEXT INCLUDED IN FIRST EXECUTION SCREEN FROM FIRST LANGUAGE TO SECOND LANGUAGE BY USING SECOND APPLICATION AND DISPLAY SAME ON DISPLAY ~450

EXTRACT TEXT INCLUDED IN CHANGED CONTENT IN RESPONSE TO CHANGING OF GIST OF CONTENT IN FIRST AREA IN STATE IN WHICH SECOND APPLICATION IS EXECUTED ~460

TRANSLATE EXTRACTED TEXT FROM FIRST LANGUAGE INTO SECOND LANGUAGE BY USING SECOND APPLICATION ~470

DISPLAY SECOND EXECUTION SCREEN CORRESPONDING TO FIRST EXECUTION SCREEN BASED ON SECOND LANGUAGE ON DISPLAY ~480

END

FIG.4

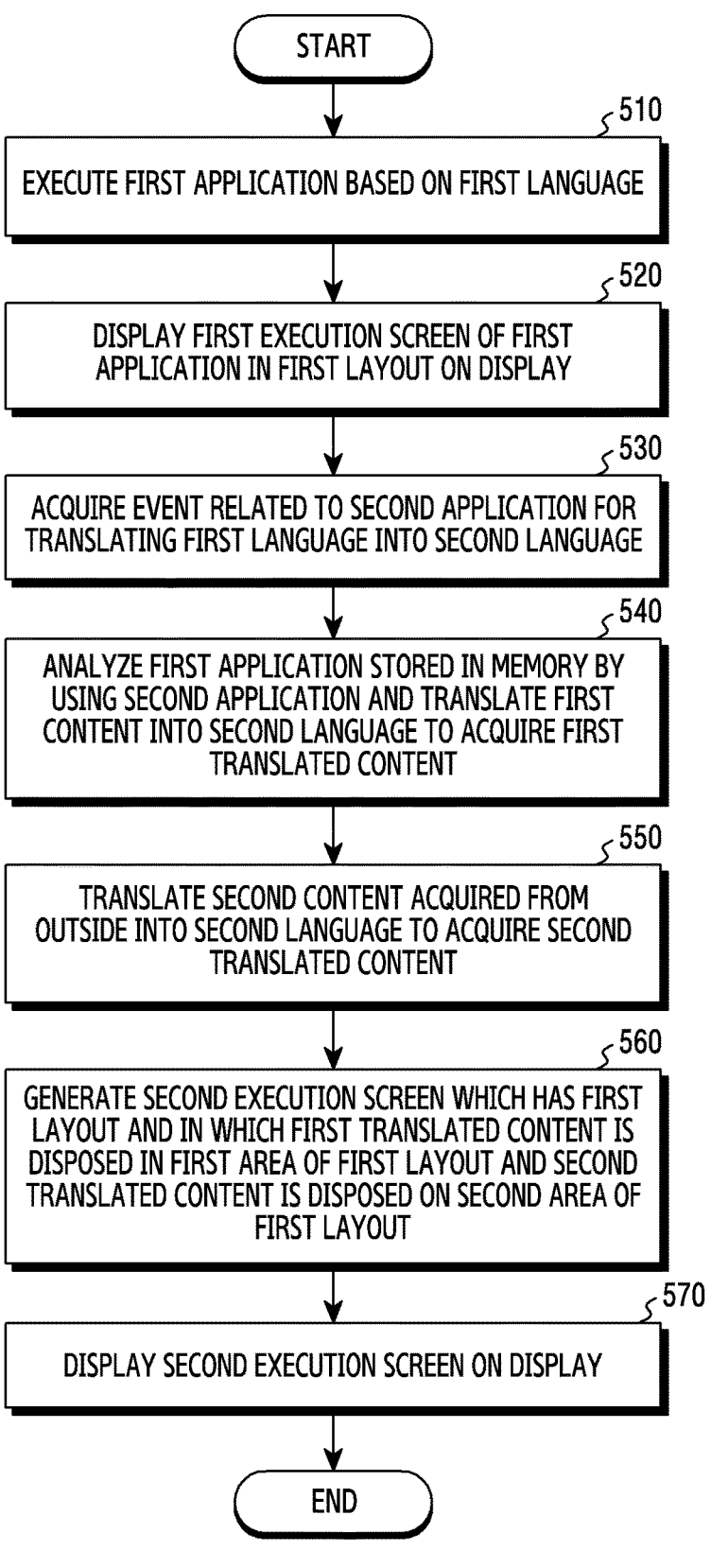

START

510

EXECUTE FIRST APPLICATION BASED ON FIRST LANGUAGE

520

DISPLAY FIRST EXECUTION SCREEN OF FIRST APPLICATION IN FIRST LAYOUT ON DISPLAY

530

ACQUIRE EVENT RELATED TO SECOND APPLICATION FOR TRANSLATING FIRST LANGUAGE INTO SECOND LANGUAGE

540

ANALYZE FIRST APPLICATION STORED IN MEMORY BY USING SECOND APPLICATION AND TRANSLATE FIRST CONTENT INTO SECOND LANGUAGE TO ACQUIRE FIRST TRANSLATED CONTENT

550

TRANSLATE SECOND CONTENT ACQUIRED FROM OUTSIDE INTO SECOND LANGUAGE TO ACQUIRE SECOND TRANSLATED CONTENT

560

GENERATE SECOND EXECUTION SCREEN WHICH HAS FIRST LAYOUT AND IN WHICH FIRST TRANSLATED CONTENT IS DISPOSED IN FIRST AREA OF FIRST LAYOUT AND SECOND TRANSLATED CONTENT IS DISPOSED ON SECOND AREA OF FIRST LAYOUT

570

DISPLAY SECOND EXECUTION SCREEN ON DISPLAY

END

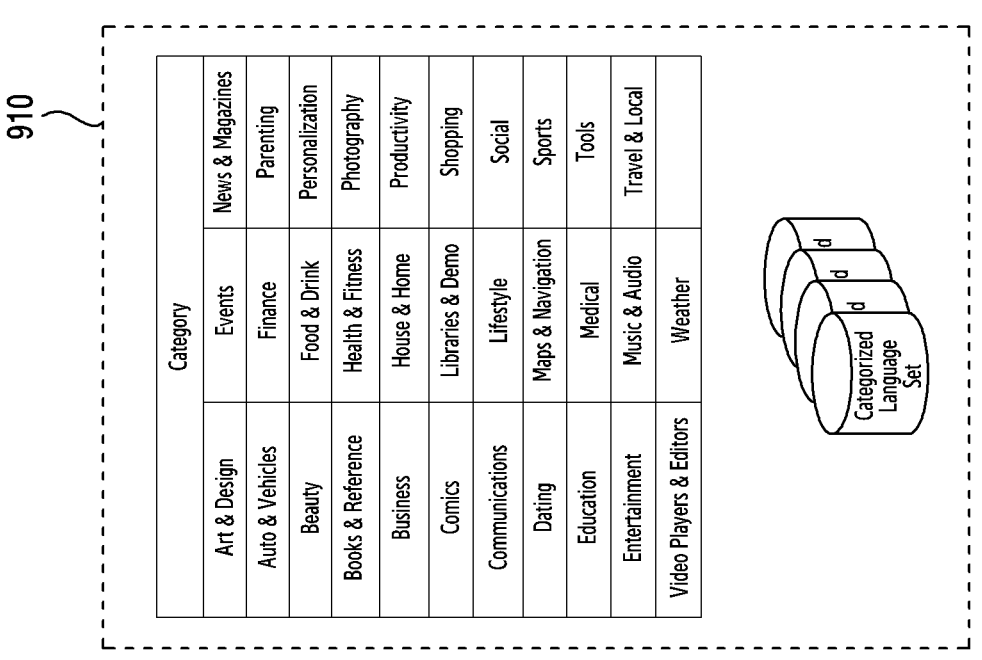
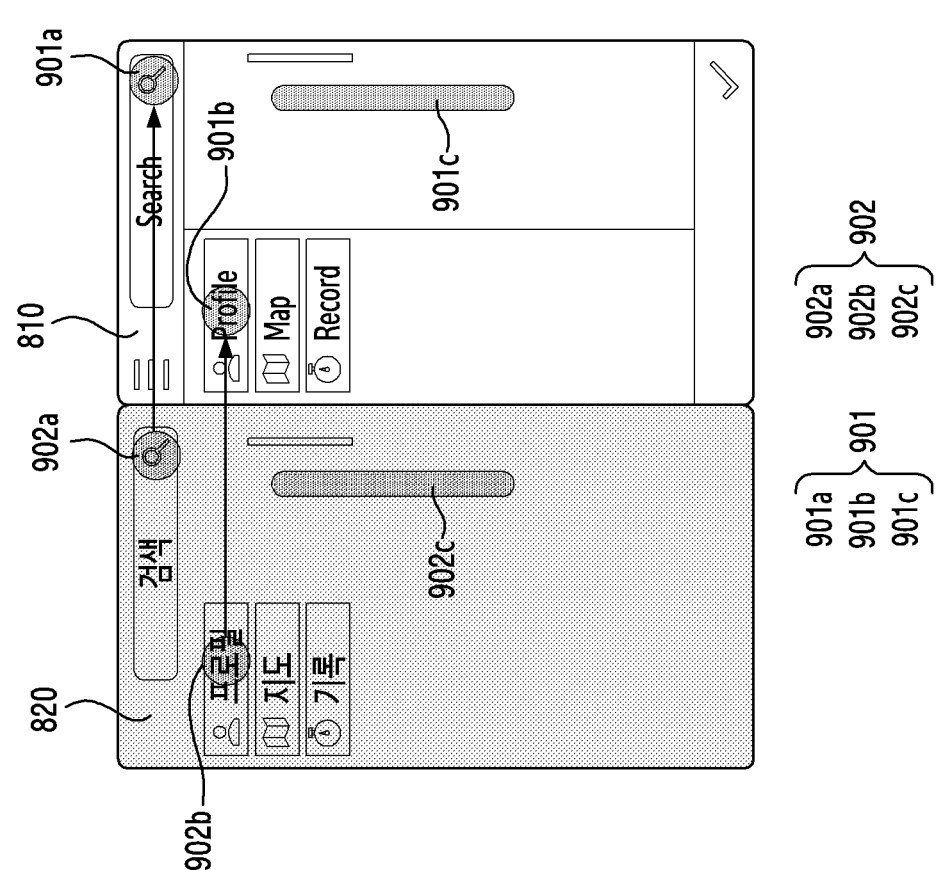
FIG.9

1100

METHOD AND ELECTRONIC DEVICE FOR PERFORMING TRANSLATION

CROSS-REFERENCE TO RELATED APPLICATION(S)

This application is a continuation application, claiming priority under § 365(c), of an International application No. PCT/KR2022/005731, filed on Apr. 21, 2022, which is based on and claims the benefit of a Korean patent application number 10-2021-0051632, filed on Apr. 21, 2021, in the Korean Intellectual Property Office, the disclosure of which is incorporated by reference herein in its entirety.

BACKGROUND

1. Field

The disclosure relates to a technology for performing translation of an application.

2. Description of Related Art

Recently, functions such as a text translation function using a translation application, a voice translation function, and a real-time translation function based on an image acquired through a camera have been widely used. An image-based translation technology corresponds to a function of extracting text information and a location from an image input through an optical character recognition (OCR) technology and converting a desired sentence into a specific language based on acquired text information. On the contrary, an Internet browser-based translation technology does not require text detection using an image-based OCR since it is possible to access resources of a source code based on hypertext markup language (HTML).

The above information is presented as background information only to assist with an understanding of the disclosure. No determination has been made, and no assertion is made, as to whether any of the above might be applicable as prior art with regard to the disclosure.

SUMMARY

In case of using an Internet browser-based translation function, only a text resource is replaced with a translated text resource in HTML and thus a text included in an image is not translated. In addition, since real-time text detection or translation is not performed, even dynamic content that is dynamically added or deleted over time is not translated.

Meanwhile, the Internet browser-based translation function may be used only when providing a web-based service and application translation is limited because access to resources is not possible when packaged as an application.

Aspects of the disclosure are to address at least the above-mentioned problems and/or disadvantages and to provide at least the advantages described below. Accordingly, an aspect of the disclosure is to provide a method and electronic device for performing translation.

Additional aspects will be set forth in part in the description which follows and, in part, will be apparent from the description, or may be learned by practice of the presented embodiments.

In accordance with an aspect of the disclosure, an electronic device is provided. The electronic device includes a display and at least one processor electrically connected to the display, wherein the at least one processor is configured to execute a first application based on a first language, display a first execution screen corresponding to the first application on the display, wherein a content, which changes after a specified time elapses from a time point at which the first application is executed, is displayed in a first area of the first execution screen, receive a first user input that is for executing a second application, execute the second application in response to receiving the first user input, translate a text included in the first execution screen from the first language to a second language using the second application and displays the translation on the display, extract a text included in the changed content in a state, in which the second application is executed and in response to the content in the first area being changed, translate the extracted text from the first language to the second language using the second application, and display a second execution screen corresponding to the first execution screen on the display based on the second language.

In accordance with another aspect of the disclosure, a method performed by an electronic device is provided. The method includes an operation of executing a first application based on a first language, an operation of displaying a first execution screen corresponding to the first application on a display of the electronic device, a content which changes after a specified time elapses from a time point the first application is executed is displayed in a first area of the first execution screen, an operation of receiving a first user input that is for executing a second application, an operation of executing the second application in response to receiving the first user input, an operation of translating a text included in the first execution screen from the first language to a second language using the second application and displaying the translation on the display, an operation of extracting the text included in the changed content in a state, in which the second application is executed and in response to the content in the first area being changed, an operation of translating the extracted text from the first language to the second language using the second application, and an operation of displaying a second execution screen corresponding to the first execution screen on the display based on the second language.

In accordance with another aspect of the disclosure, an electronic device is provided. The electronic device includes a memory for storing a first application and a second application, a communication circuit, a display, and at least one processor connected to the memory, the communication circuit, and the display, wherein the at least one processor executes the first application based on a first language, displays a first execution screen of the first application in a first layout on the display, a first content acquired from the memory being disposed on a first area of the first layout, a second content acquired from the outside through the communication circuit being disposed on a second area of the first layout, acquires an event related to the second application for translating the first language into a second language, analyzes the first application stored in the memory by using the second application and translates the first content into the second language so as to acquire a first translation content, translates the second content acquired from the outside into the second language to acquire a second translation content, generates a second execution screen which has the first layout and in which the first translation content is disposed on the first area of the first layout and the second translation content is disposed on the second area of the first layout, and displays the second execution screen on the display.

An electronic device and method in various embodiments of the disclosure may provide an interaction between an application subject to translation and an application to show a translation result so as to improve user's experience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart illustrating translation of a first application (e.g., a translation target application) by using a second application (e.g., a translation application) in an electronic device according to an embodiment of the disclosure;

FIG. 5 is a flowchart illustrating translation of a content stored in a memory and content acquired from the outside by an electronic device by using a second application (e.g., a translation application) according to an embodiment of the disclosure;

FIG. 9 is diagram illustrating acquiring attribute information of a first application (e.g., a translation target application) in an electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
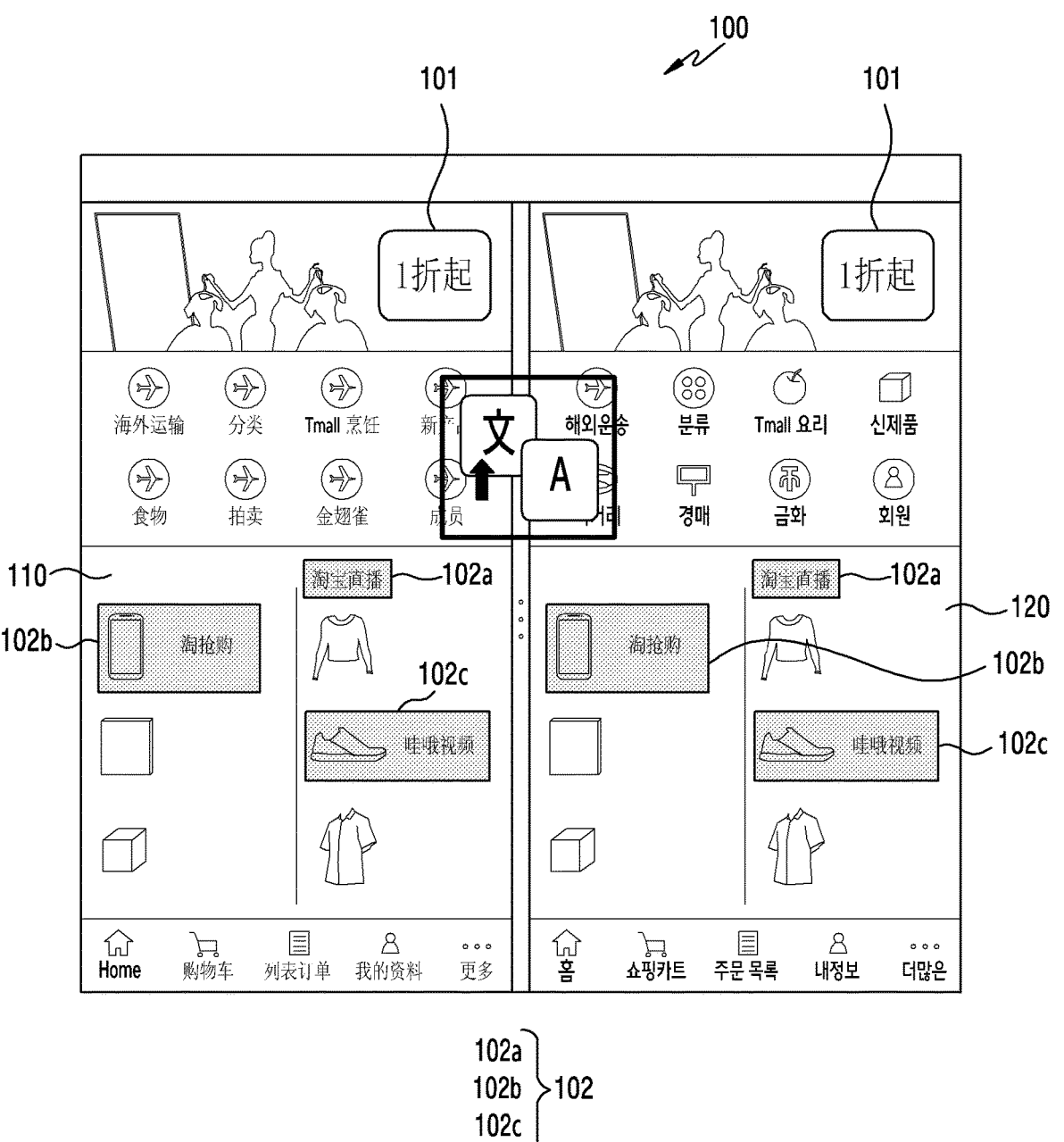
FIG. 1 is a diagram illustrating providing translation information on a first application (e.g., a translation target application) by using a second application (e.g., a translation application) in an electronic device according to an embodiment of the disclosure.

FIG. 1 is a diagram illustrating providing translation information on a first application (e.g., a translation target application) by using a second application (e.g., a translation application) in an electronic device according to an embodiment of the disclosure.

Referring to FIG. 1, the electronic device 100 according to an embodiment may execute a first application (e.g., a translation target application) stored in a memory. For example, the first application may have a first language as a basic language. According to an embodiment, the electronic device 100 may display a first execution screen 110 on a display based on the first language of the first application.

According to an embodiment, the electronic device 100 may acquire a resource file of the first application. According to an embodiment, the electronic device 100 may store a resource file of the first application in the memory and access the resource file stored in the memory.

According to an embodiment, the electronic device 100 may extract information required for configuring an execution screen of the first application from the acquired resource file. For example, the electronic device 100 may extract a size of an image to be displayed on the first execution screen 110, a location in which an image is to be displayed on the first execution screen 110, a font, font color, character spacing, and line spacing of a text to be displayed on the first execution screen 110, a location in which a text is displayed on the first execution screen 110, and/or a category of the first application. Furthermore, for example, the electronic device 100 may acquire information on a color of an image to be displayed on the first execution screen and/or type of an object in the image.

According to an embodiment, the electronic device 100 may display a user interface (UI) including an image and/or text on the first execution screen 110 based on the information acquired from the resource file. For example, the electronic device 100 may display a first UI 102*a*, a second UI 102*b*, and a third UI 102C on the first execution screen 110 based on the information acquired from the resource file.

According to an embodiment, the electronic device 100 may acquire information required for configuring an execution screen of the first application from the outside. According to an embodiment, the electronic device 100 may display a content 101 on the first execution screen 110 based on the information acquired from the outside.

According to an embodiment, the electronic device 100 may execute a second application (e.g., a translation application) stored in the memory to translate a text in the first execution screen 110. According to an embodiment, the electronic device 100 may translate the text displayed in the first language on the first execution screen 110 into a second language by using the second application.

According to an embodiment, the electronic device 100 may translate a text included in the UI 102 displayed based on the information acquired from the resource file. For example, the electronic device 100 may replace the text of the first language included in the UI 102 displayed based on the information acquired from the resource file with a text of the second language.

According to an embodiment, the electronic device 100 may translate a text included in the content 101 displayed based on the information acquired from the outside. According to an embodiment, in case that the content 101 displayed based on the information acquired from the outside is changed over time, the electronic device 100 may perform translation with respect to the changing content in real time. For example, in case that at least a portion of the content 101 displayed based on the information acquired from the outside is changed or deleted over time, the electronic device 100 may perform translation from the first language into the second language with respect to the changing content in real time.

According to an embodiment, the electronic device 100 may display a second execution screen 120 corresponding to the first execution screen 110 on the display 220 based on the second language. According to an embodiment, the second execution screen 120 may output a text included the UI 102 displayed based on the information acquired from the resource file and/or in the content 101 displayed based on the information acquired from the outside into the second language.

Figure 2:
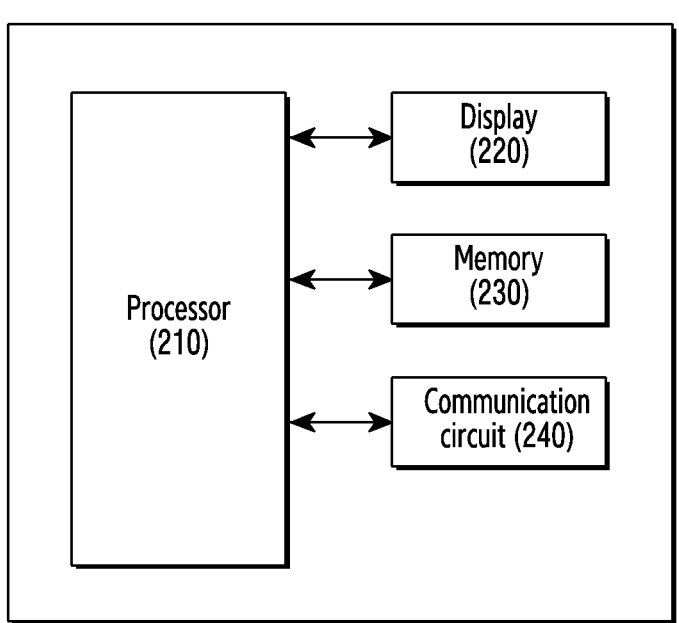
FIG. 2 is a block diagram illustrating an electronic device according to an embodiment of the disclosure.

FIG. 2 is a block diagram illustrating an electronic device according to an embodiment of the disclosure.

Referring to FIG. 2, the electronic device 100 may include a processor 210, a display 220, a memory 230, and a communication circuit 240. In various embodiments, the electronic device 100 may include additional components other than the component described in FIG. 2 or omit at least one of the components described in FIG. 2.

According to an embodiment, the processor 210 may control at least one other component of the electronic device 100 and/or perform data processing or calculation with respect to communication, by using instructions stored in the memory 230. According to an embodiment, the processor 210 may include at least one of a central processing unit (CPU), a graphics processing unit (GPU), a micro controller unit (MCU), a sensor hub, a supplementary processor, a communication processor, an application processor, an application specific integrated circuit (ASIC), and a field programmable gate array (FPGA), and may have multiple cores.

According to an embodiment, the processor 210 may execute an application stored in the memory 230. For example, the processor 210 may execute a first application (e.g., a translation target application) and/or a second application (e.g., a translation application) stored in the memory 230.

According to an embodiment, the processor 210 may receive information required for translating a text in an execution screen of an application and information required for generating an execution screen of an application including a translated text from the electronic device 100. According to an embodiment the processor 210 may acquire a translated text or generate an execution screen of an application including a translated text by using information required for translating a text in an execution screen of an application and information required for generating an execution screen of an application including a translated text.

According to an embodiment, the processor 210 may translate a text in the execution screen of an application by using font information of a text, attribute information of an execution screen, or information on a category of an application. According to an embodiment, the processor 210 may provide an execution screen of an application including a translated text through the display 220.

According to an embodiment, the display 220 may generate a driving signal by converting an image signal, a data signal, a control signal, and the like processed in the processor 210. According to an embodiment, the display 220 may be realized as a plasma display panel (PDP), a liquid crystal display (LCD), an organic light-emitting diode (OLED), a flexible display, and the like or may be realized as a three-dimensional display (3D display). According to an embodiment, the display 220 may be realized as a touch screen to be used as an input device in addition to an output device.

According to an embodiment, the memory 230 may correspond to a set of one or more memories. According to an embodiment, the memory 230 may store data and/or a command received from other component (e.g., the processor 210, the display 220, or the communication circuit 240) or generated by other components. According to various embodiments, the memory 230 may store an application (e.g., a translation target application or translation application).

According to an embodiment, the communication circuit 240 may establish a communication link between the electronic device 100 and an external electronic device and may perform communication through the established communication link. According to an embodiment, the communication circuit 240 may acquire information required for configuring an execution screen of the application from the outside. For example, the communication circuit 240 may receive information on at least one content for configuring an execution screen of the first application from the outside.

Figure 3:
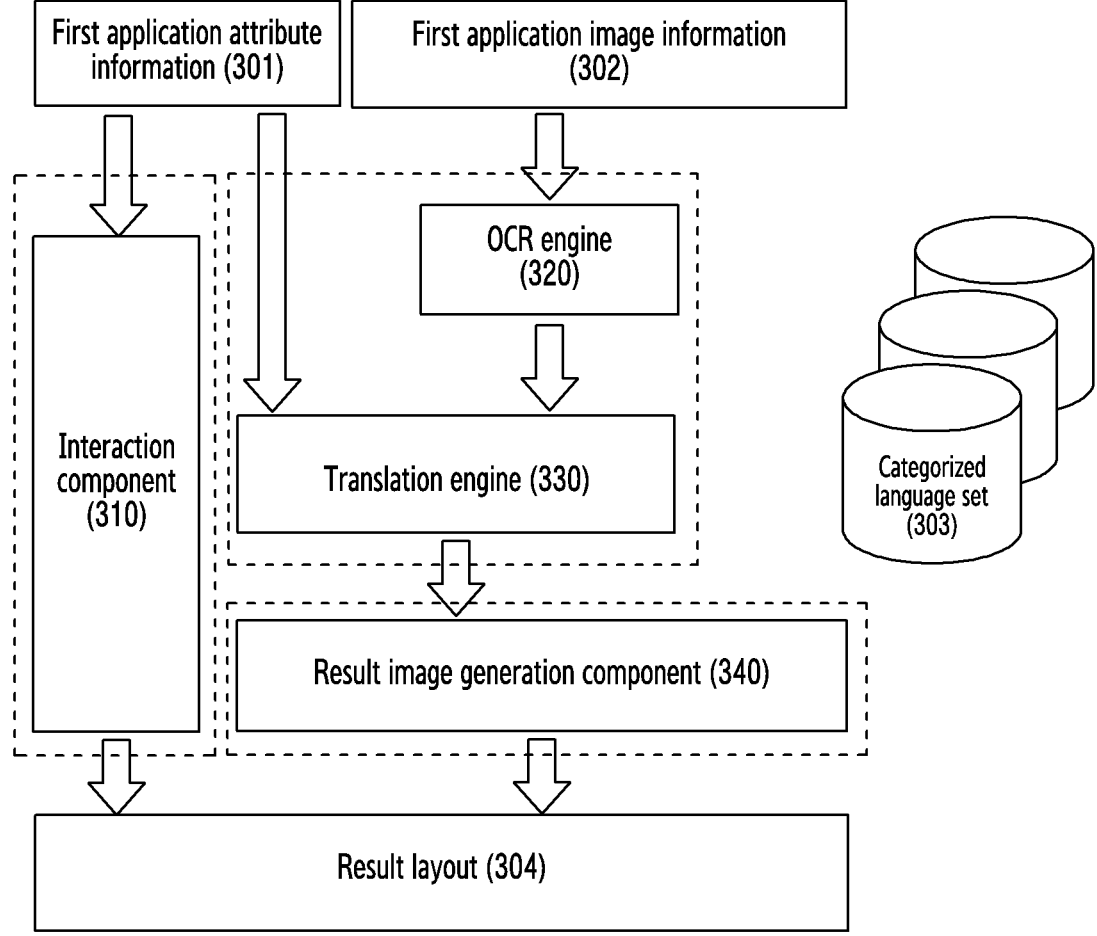
FIG. 3 is a diagram illustrating a configuration for performing translation with respect to an application in an electronic device according to an embodiment of the disclosure.

FIG. 3 is a diagram illustrating a configuration for performing translation with respect to an application in an electronic device according to an embodiment of the disclosure.

Referring to FIG. 3, the electronic device 100 may include an interaction component (event mapper) 310, an optical character recognition (OCR) engine 320, a translation engine (translate engine) 330, and a result image generation component (result stream generator) 340. In various embodiments, the electronic device 100 may include additional components other than the component described in FIG. 3 or omit at least one of the components described in FIG. 3.

According to an embodiment, the OCR engine 320 may receive first application image information 302. According to an embodiment, the first application image information 302 may include at least one of a text to be displayed on the execution screen of the first application, a text location, a peripheral image of a text required for rendering, and information on a peripheral color of a text. According to an embodiment, the acquired information may be transferred to the translation engine 330 to proceed translation into a specific language with respect to a detected text.

According to an embodiment, the translation engine 330 may acquire first application attribute information 301. For example, the first application attribute information may include at least one of information on an executing application, category information on at least one content output on a screen, and text information extracted through the OCR. According to an embodiment, the translation engine 330 may specify at least one content being output on a screen by using the first application attribute information 301. According to an embodiment, the translation engine 330 may perform translation by dynamically changing a categorized language set 303 based on the first application attribute information 301.

According to the embodiment described above, the translation engine 300 may perform translation into phrases that match well with the application or content by using different databases (e.g., the categorized language set 303) for each category of applications.

According to an embodiment, the result image generation component 340 may generate a result layout 304 indicating a content translated by the OCR engine 320 and the translation engine 330. According to an embodiment, the result image generation component 340 may acquire a location of a text included in an execution screen of a first application (e.g., an original application), a peripheral image of a text, and a translated text to be overlaid on the execution screen of the first application or displayed on a layout arranged in parallel with the execution screen of the first application.

According to an embodiment, the interaction component 310 may transfer an event occurring on a result layout 304 to the first application. According to the embodiment described above, the electronic device 100 may allow interaction between the result layout 304 and the first application to execute a function corresponding to the event occurring on the result layout 304 in the first application.

FIG. 4 is a flowchart illustrating translation of a first application (e.g., a translation target application) by using a second application (e.g., a translation application) in an electronic device according to an embodiment of the disclosure.

Referring to FIG. 4, a processor 210 according to an embodiment may execute a first application based on a first language in operation 410. According to an embodiment, the processor 210 may receive a user input (e.g., a touch input) for executing the first application stored in a memory 230. According to an embodiment, the processor 210 may execute the first application in response to reception of the user input with respect to the first application. According to an embodiment, the first application may have a first language as a basic language.

According to an embodiment, in operation 420, the processor 210 may display a first execution screen corresponding to the first application on a display. According to an embodiment, the processor 210 may output the first execution screen through the display 220 in response to reception of the user input with respect to the first application. According to an embodiment, the processor 210 may display a text included in the first execution screen in the first language.

According to an embodiment, the processor 210 may display at least one content on a first area of the first execution screen. According to an embodiment, the content displayed on the first area may be changed over time. For example, the processor 210 may display a content of which an image and/or text changes after a specified time elapses from the time point the first application is executed in a first area.

According to an embodiment, the processor 210 may receive a user input with respect to a second application in operation 430. According to an embodiment, the processor 210 may receive a user input (e.g., a touch input) for executing the second application stored in the memory 230. According to an embodiment, the second application may include an application for translating an application being executed in the electronic device 100.

According to an embodiment, the processor 210 may execute the second application in response to reception of the user input in operation 440. For example, the processor 210 may execute the second application in response to reception of the touch input with respect to the second application. According to an embodiment, the processor 210 may execute the second application as a background.

According to an embodiment, in operation 450, the processor 210 may translate a text included in the first execution screen from the first language into the second language by using the second application to be displayed on the display. According to an embodiment, the processor 210 may translate a text displayed based on the information acquired from the resource file. For example, the electronic device 100 may replace the text of the first language displayed based on the information acquired from the resource file with a text of the second language.

According to an embodiment, the processor 210 may translate a text included in the content displayed based on the information acquired from the outside. According to an embodiment, the electronic device 100 may replace the content displayed based on the information acquired from the outside from the text of the first language into the text of the second language.

According to an embodiment, the processor 210 may display a text included in the first execution screen of the first application on the display based on the second language.

According to an embodiment, in operation 460, the processor 210 may extract a text included in a content changed in response to a change of a gist of the content of the first area in a state in which the second application is executed. According to an embodiment, the processor 210 may determine whether a gist of the content disposed on the first area of the first execution screen is changed, in a state in which the second application is executed. For example, the processor 210 may determine whether an image and/or text included in the content displayed on the first area is changed or deleted.

According to an embodiment, in case that the gist of the content displayed on the first area is determined to be changed, the processor 210 may analyze a changed content.

According to an embodiment, by analyzing the changed content, the processor 210 may acquire information on a location on which an image and/or text is to be displayed on the execution screen, and a font of a text to be displayed on the execution screen, a font color, a character space, a line spacing, and a category of the changed content. According to an embodiment, the processor 210 may extract a text displayed in the first language from the changed content.

According to an embodiment, in operation 470, the processor 210 may translate the extracted text from the first language into the second language by using the second application. For example, the second language may correspond to a language configured as a basic language in the electronic device 100. Furthermore, for example, the second language may correspond to a language configured based on a user input.

According to an embodiment, the processor 210 may translate the extracted text from the first language into the second language based on a result of the analysis with respect to the content displayed on the first area. According to an embodiment, the processor 210 may translate the text extracted based on the information on the category of the changed content from the first language into the second language. According to an embodiment, the processor 210 may determine a category learning model according to information on a category of the application and/or a category of the changed content. According to an embodiment, the processor 210 may translate the extracted text from the first language into the second language by using the determined category learning model.

According to an embodiment, in operation 480, the processor 210 may display a second execution screen corresponding to the first application on the display based on the second language. According to an embodiment, the processor 210 may generate a second execution screen corresponding to the first application based on the second language. For example, the processor 210 may generate an execution screen of an application in an image (or video).

According to an embodiment, the processor 210 may generate a second execution screen based on information acquired from the resource file for configuring a first execution screen and information acquired by analyzing a changed content. For example, the processor 210 may generate a second execution screen based on a size of an extracted text, a size of a translated text, a location of an image and/or text to be disposed on an execution screen, and a location of a translated text to be disposed on the execution screen. According to an embodiment, the processor 210 may determine a location and a size of a translated text so that a layout of the second execution screen corresponds to a layout of the first execution screen.

According to an embodiment, the processor 210 may display the generated second execution screen on the display 220. According to an embodiment, the processor 210 may display the second execution screen on the display 220 based on the translated second language. For example, the second execution screen may be arranged in parallel with the first execution screen. In addition, for example, the second execution screen may be displayed to superimpose the first execution screen.

FIG. 5 is a flowchart illustrating translation of a content stored in a memory and content acquired from the outside by an electronic device by using a second application (e.g., a translation application) according to an embodiment of the disclosure. With respect to FIG. 5, a description similar to or overlapping the aforementioned description may be simplified or omitted.

Referring to FIG. 5, a processor 210 according to an embodiment may execute a first application based on a first language in operation 510. According to an embodiment, the processor 210 may receive a user input (e.g., a touch input) for executing the first application stored in a memory 230. According to an embodiment, the processor 210 may execute the first application in response to reception of the user input with respect to the first application. According to an embodiment, the first application may have a first language as a basic language.

According to an embodiment, in operation 520, the processor 210 may display a first execution screen of the first application on a display 220 in a first layout. According to an embodiment, the first layout may have a first length in a vertical direction and a second length shorter than the first length in a horizontal direction.

According to an embodiment, a first content acquired from a memory 230 may be disposed on a first area of the first layout, and a second content acquired from the outside through a communication circuit 240 may be disposed on a second area of the first layout. According to an embodiment, the processor 210 may display the first content acquired from a resource file stored in the memory 230 on the first area.

According to an embodiment, the processor 210 may display the second content acquired from the outside through the communication circuit 240 on the second area. According to an embodiment, in case that a gist of the second content acquired from the outside is changed over time, the processor 210 may output the changing gist on the second area in real time. For example, in case that an image and/or text included in the second content is changed, the changing image and/or text may be output on the second area in real time.

According to an embodiment, in operation 530, the processor 210 may acquire an event related to the second application for translating the first language into a second language. According to an embodiment, the processor 210 may receive a user input for executing the second application. For example, the processor 210 may receive a touch input with respect to the second application.

According to an embodiment, in operation 540, the processor 210 may analyze the first application stored in the memory by using the second application and translate the first content into the second language so as to acquire a first translated content. According to an embodiment, the processor 210 may translate the first content acquired from the resource file stored in the memory 230 into the second language to acquire the first translated content.

According to an embodiment, the processor 210 may acquire the first translated content based on a size of an image and/or text included in the first content and a location thereof displayed within an execution screen. For example, a size of a text included in the first translated content and a location thereof displayed within an execution screen may correspond to the size of a text included in the first content and the location thereof displayed within an execution screen, respectively.

According to an embodiment, in operation 550, the processor 210 may translate the second content acquired from the outside into the second language to acquire a second translated content. According to an embodiment, the processor 210 may translate the second content acquired through the communication circuit 240 into the second language to acquire a second translated content.

According to an embodiment, the processor 210 may acquire the second translated content based on a size of an image and/or text included in the second content and a location thereof displayed within an execution screen. For example, a size of a text included in the second translated content and a location thereof displayed within an execution screen may correspond to the size of a text included in the second content and the location thereof displayed within an execution screen, respectively.

According to an embodiment, in case that a gist of the second content is changed over time, the processor 210 may acquire the second translated content corresponding to the changing gist in real time. For example, in case that an image and/or text included in the second content is changed or deleted, the processor 210 may acquire the second translated content to correspond to a changed or deleted gist.

According to an embodiment, in operation 560, the processor 210 may generate the second execution screen which has first layout and in which the first translated content is disposed on the first area of the first layout and the second translated content is disposed on the second area of the first layout. According to an embodiment, the processor 210 may generate the second execution screen in consideration of a location and size of an image and/or text to be displayed within the first execution screen, and a font, a font color, a character spacing, and a line spacing of a text to be displayed within the first execution screen.

According to an embodiment, in operation 570, the processor 210 may display the second execution screen on the display. According to an embodiment, the processor 210 may display the second execution screen on the display 220 based on the second language. According to an embodiment, the processor 210 may display the second execution screen including the first translated content and the second translated content on the display 220. For example, the second execution screen may be arranged in parallel with the first execution screen. In addition, for example, the second execution screen may be displayed to superimpose the first execution screen.

Figure 6:
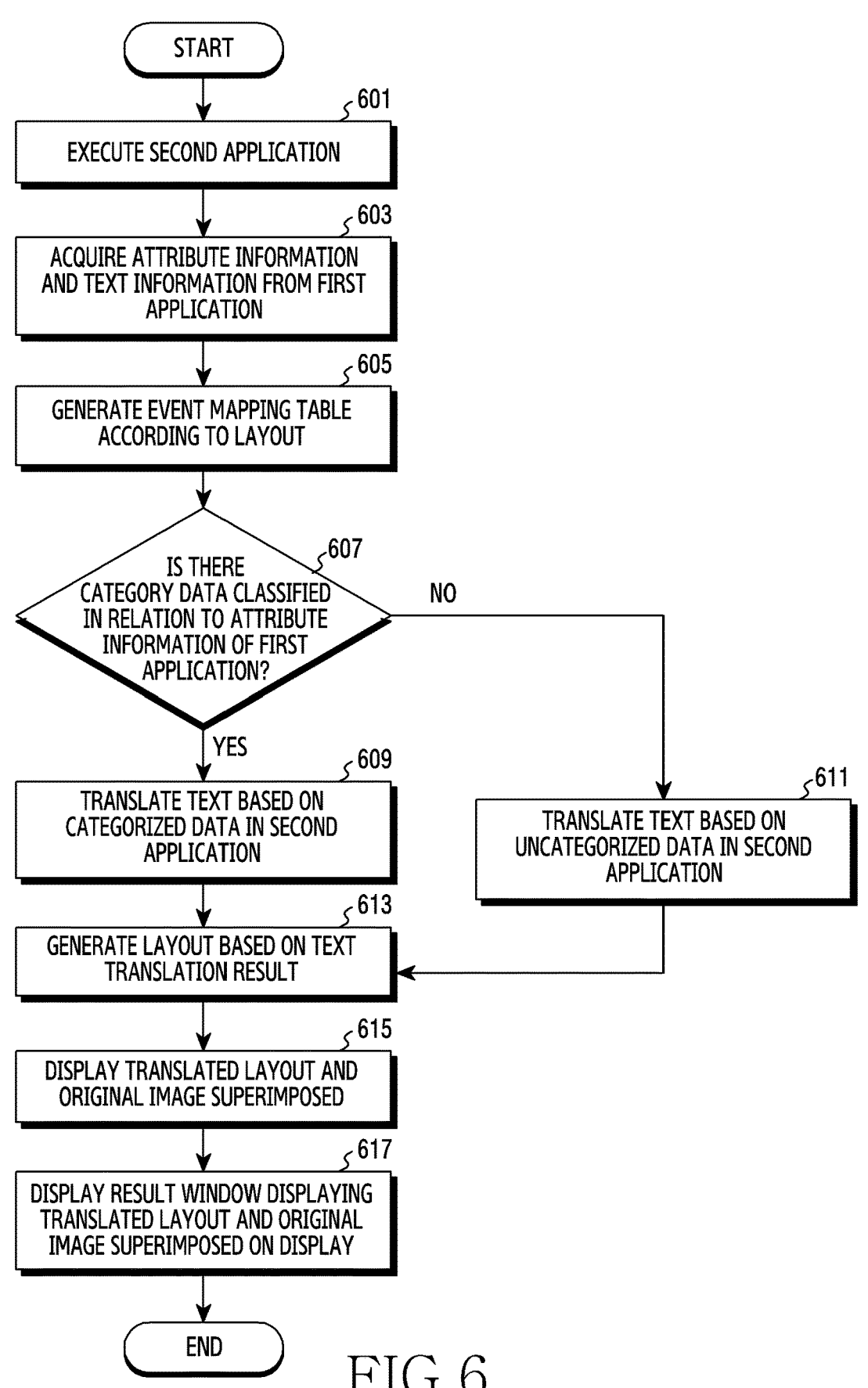
FIG. 6 is a flowchart illustrating forming a layout based on a translation result of an execution screen of a first application (e.g., a translation target application) in an electronic device according to an embodiment of the disclosure.

FIG. 6 is a flowchart illustrating forming a layout based on a translation result of an execution screen of a first application (e.g., a translation target application) in an electronic device according to an embodiment of the disclosure. In relation to a description of FIG. 6, a content corresponding or similar to the aforementioned description may be simplified or omitted.

Referring to FIG. 6, in operation 601, a processor 210 according to an embodiment may execute a second application. According to an embodiment, the processor 210 may execute the second application in response to reception of a user input with respect to the second application stored in a memory 230. For example, the user input may include at least one of a touch input and a voice input with respect to a display 220.

According to an embodiment, in operation 603, the processor 210 may acquire attribute information and text information from a first application. According to an embodiment, the attribute information may include at least one information of a size and a location of a first execution screen of the first application and a category of the first application. For example, the information on a category of the first application may be stored in an application market (e.g., a play store or app store) from which an application may be downloaded in a form of information on the corresponding application. In addition, for example, the category of the application may include at least one of finance, game, health, education, social, map, and shopping. According to an embodiment, the text information may include at least one of a location where the text is to be displayed in the execution screen, a font, a text color, character spacing, and line spacing, and peripheral image information of the text.

According to an embodiment, in operation 605, the processor 210 may generate an event mapping table according to a layout. According to an embodiment, the processor 210 may transfer an event occurring on a translated layout to the first application. According to the embodiment, the processor 210 may allow interaction between the translated layout and the first application to execute a function corresponding to the event occurring on the translated layout in the first application.

According to an embodiment, in operation 607, the processor 210 may identify whether there is classified category data in association with the attribute information of the first application. According to an embodiment, the processor 210 may determine a category of a content provided by the first application. According to an embodiment, the processor 210 may determine whether there is a learning model with respect to the determined category.

According to an embodiment, in case of determining that there is classified category data, in operation 609, the processor 210 may translate a text based on categorized data in the second application. According to an embodiment, in case of determining that there is a learning model with respect to the determined category, the processor 210 may translate the text from the first language to the second language by applying the learning model.

According to an embodiment, in case of not determining that there is classified category data, in operation 611, the processor 210 may translate a text based on uncategorized data in the second application. According to an embodiment, in case of not determining that there is a learning model with respect to the determined category, the processor 210 may translate the text from the first language to the second language without applying the learning model.

According to an embodiment, in operation 613, the processor 210 may generate a layout based on a text translation result. According to an embodiment, the processor 210 may generate a layout translated from the first language into the second language. According to an embodiment, the processor 210 may generate a translated layout based on the attribute information of the first application and text information.

According to an embodiment, in operation 615, the processor 210 may display the translated layout and an original image superimposed. According to an embodiment, the processor 210 may display the translated layout and the original image superimposed so that a position and a size of a translated content included in the translated layout correspond to a location and a size of a content included in the original image.

According to an embodiment, in operation 617, the processor 210 may display a result window displaying the translated layout and an original image superimposed. According to an embodiment, the processor 210 may arrange the result window and the original image in parallel with each other and provide same through the display 220. According to an embodiment, the processor 210 may display the result window and the original image superimposed on the display 220.

Figure 7:
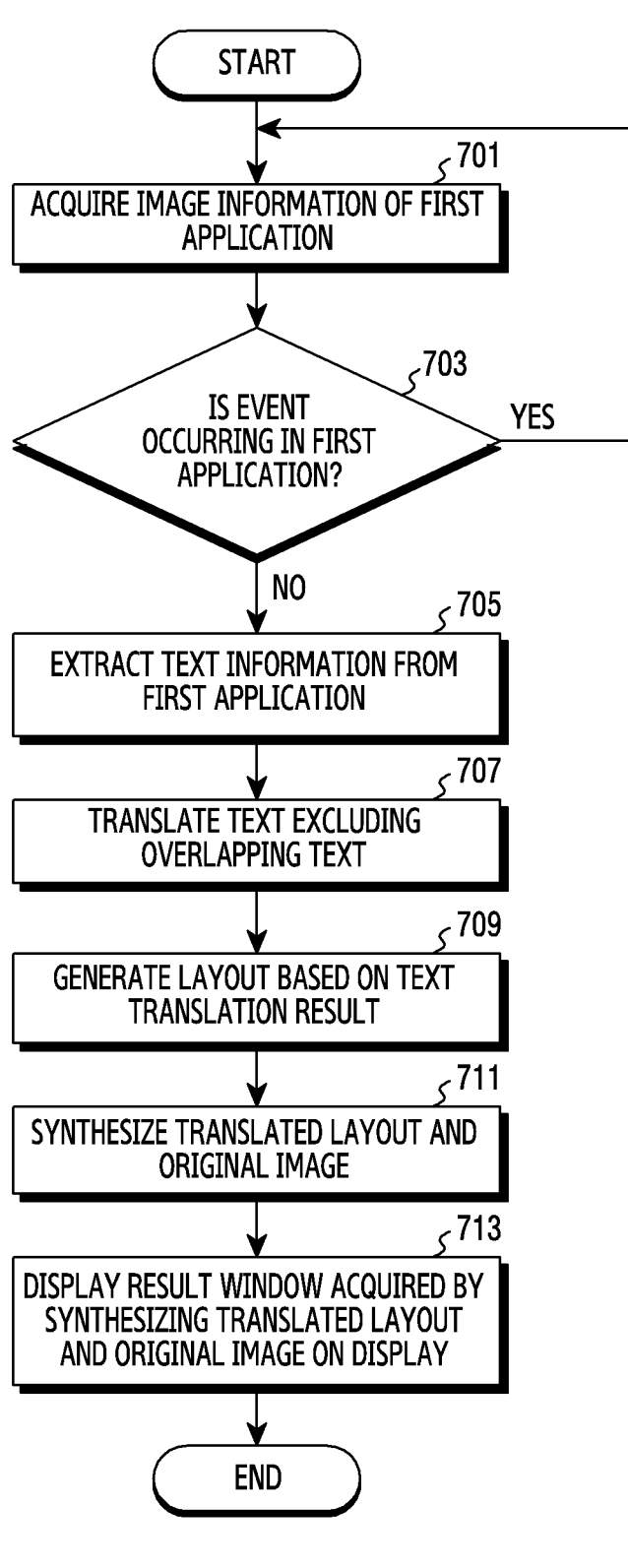
FIG. 7 is a flowchart illustrating performing translation based on whether an event is occurring in a first application (e.g., a translation target application) in an electronic device according to an embodiment of the disclosure.

FIG. 7 is a flowchart illustrating performing translation based on whether an event is occurring in a first application (e.g., a translation target application) in an electronic device according to an embodiment of the disclosure. In relation to a description of FIG. 7, a content similar to or overlapping the aforementioned description may be simplified or omitted.

Referring to FIG. 7, in operation 701, a processor 210 according to an embodiment may acquire image information of a first application. According to an embodiment, the processor 210 may acquire real-time image information of the first application. For example, the real-time image information may include at least one of frame buffer and acquisition time.

According to an embodiment, in operation 703, the processor 210 may determine whether an event is occurring in the first application. According to an embodiment, the processor 210 may determine whether an event in which a change amount of a screen is greater than or equal to a threshold value is occurring in the first application. For example, the event in which a change amount of a screen is greater than or equal to a threshold value may include at least one of scroll and page movement.

According to an embodiment, in operation 705, the processor 210 may extract text information from the first application in case of not determining that an event is occurring in the first application. According to an embodiment, in case of detecting that the change amount of the screen is less than or equal to the threshold value in the first application, the processor 210 may extract text information by using the OCR. According to an embodiment, the processor 210 may acquire a location and size of a text to be displayed on an execution screen of the first application, and/or a peripheral image information of the text by using the OCR.

According to an embodiment, in case of determining that the event is occurring in the first application, the processor 210 may return to operation 701 and acquire image information of the first application.

According to an embodiment, in operation 707, the processor 210 may perform translation of texts excluding an overlapping text. According to an embodiment, the processor 210 may perform translation of the text excluding a text of which translation is already completed among texts extracted from the execution screen of the first application. For example, the text of which translation is already completed may have been processed in a translation engine 330 or may include a text overlapping a target to be processed in the translation engine 330.

According to an embodiment, the processor 210 may translate a text in response to completion of text extracting. For example, the processor 210 may translate a text from a first language into a second language. According to an embodiment, the processor may perform translation based on a database selected based on a category of a content provided by the first application.

According to an embodiment, in operation 709, the processor 210 may generate a layout based on a text translation result. According to an embodiment, the processor 210 may generate a layout based on a translation result of a text extracted from an execution screen of the first application. According to an embodiment, the processor 210 may generate a layout translated from the first language into the second language.

According to an embodiment, in operation 711, the processor 210 may display the translated layout and an original image superimposed. According to an embodiment, the processor 210 may display the translated layout and the original image superimposed by using location information and peripheral color information of the text acquired through the OCR. For example, the processor 210 may remove a text from the original image, fill an image of a peripheral color of the text, and then display the translated text over the filled image.

According to an embodiment, in operation 713, the processor 210 may display a result window displaying the translated layout and the original image superimposed. For example, the processor 210 may arrange the result window in parallel with the original image or output the result window and the original image superimposed through the display 220.

According to the embodiment described above, the electronic device 100 may perform translation in response to detecting that the change amount of a screen is less than or equal to the threshold value to perform translation even for a screen with a lot of dynamic contents.

Figure 8A:
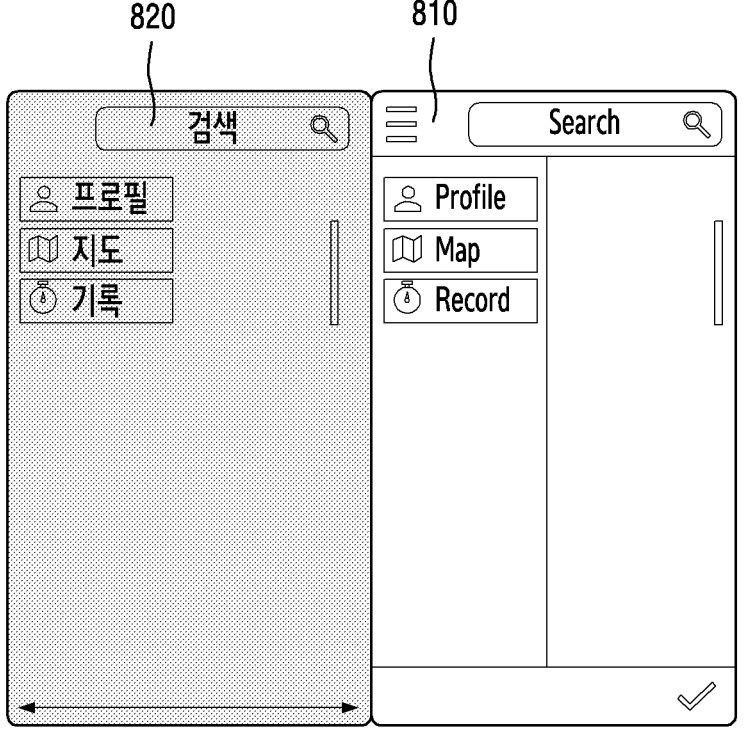
FIG. 8A is a diagram illustrating arranging and displaying layouts indicating an execution screen of a first application and a translation result in parallel in an electronic device according to an embodiment of the disclosure.
Figure 8B:
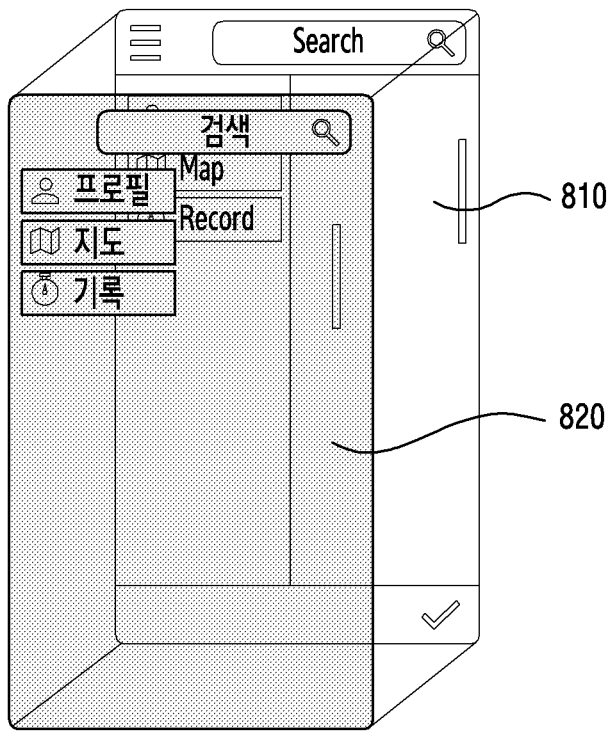
FIG. 8B is a diagram illustrating arranging and displaying layouts indicating an execution screen of a first application and a translation result superimposed in an electronic device according to an embodiment of the disclosure.

FIG. 8A is a diagram illustrating arranging and displaying layouts indicating an execution screen of a first application and a translation result in parallel in an electronic device according to an embodiment of the disclosure. FIG. 8B is a diagram illustrating arranging and displaying layouts indicating an execution screen of a first application and a translation result superimposed in an electronic device according to another embodiment of the disclosure.

Referring to FIG. 8A, a processor 210 according to an embodiment may arrange and display a first execution screen 810 of a first application in parallel with a second execution screen 820 acquired by translating the first execution screen 810 through a second application. For example, the first execution screen may be arranged on a left or right side of the second execution screen.

Referring to FIG. 8B, a processor 210 according to an embodiment may display the first execution screen 810 of the first application superimposed on the second execution screen 820 acquired by translating the first execution screen 810 through the second application. For example, the second execution screen 820 may be displayed and superimposed on the first execution screen 810.

FIG. 9 is diagram illustrating acquiring attribute information of a first application (e.g., a translation target application) in an electronic device according to an embodiment of the disclosure.

Referring to FIG. 9, a processor 210 according to an embodiment may perform translation through a second application based on attribute information acquired from a first application. According to an embodiment, the processor 210 may generate a second execution screen 820 acquired by translating a first execution screen 810 of the first application by using the second application.

According to an embodiment, the processor 210 may acquire size information of the first execution screen 810. For example, the processor 210 may acquire information on a vertical length and a horizontal length of the first execution screen 810. According to an embodiment, the processor 210 may generate the second execution screen 820 having the same size as that of the first execution screen 810. For example, the processor 210 may generate the second execution screen 820 so that a vertical length and a horizontal length of the second execution screen 820 are identical to a vertical length and a horizontal length of the first execution screen 810, respectively.

According to an embodiment, the processor 210 may acquire location information and size information on a UI 901 included in the first execution screen 810. For example, the processor 210 may acquire information on locations and sizes of a first UI 901*a*, a second UI 901*b*, and/or a third UI 901*c* to be displayed within the first execution screen 810.

According to an embodiment, the processor 210 may determine a location and a size of a UI 902 to be displayed on the second execution screen 820 based on location information and size information on the UI 901 included in the first execution screen 810. For example, the processor 210 may display, on the second execution screen 820, a fourth UI 902*a*, a fifth UI 902*b*, and a sixth UI 902*c* to be displayed on the second execution screen 820 so that locations and sizes thereof are to correspond to the first UI 901*a*, the second UI 901*b*, and the third UI 901*c* to be displayed on first execution screen, respectively.

According to an embodiment, the processor 210 may acquire category information of the first application. According to an embodiment, the processor 210 may determine a database 910 to be applied to translation based on the category information of the first application.

According to an embodiment, the processor 210 may translate a text in the first language within the content into the second language by using the database 910 determined based on the category information of the application. For example, in case that the content includes a text of "sand box", the text may be translated into "샌드박스" [sand box] when using a database with respect to a first category (e.g., News) and may be translated into "모래놀이 장난감" [sand play toy] when using a second category (e.g., shopping).

Figure 10A:
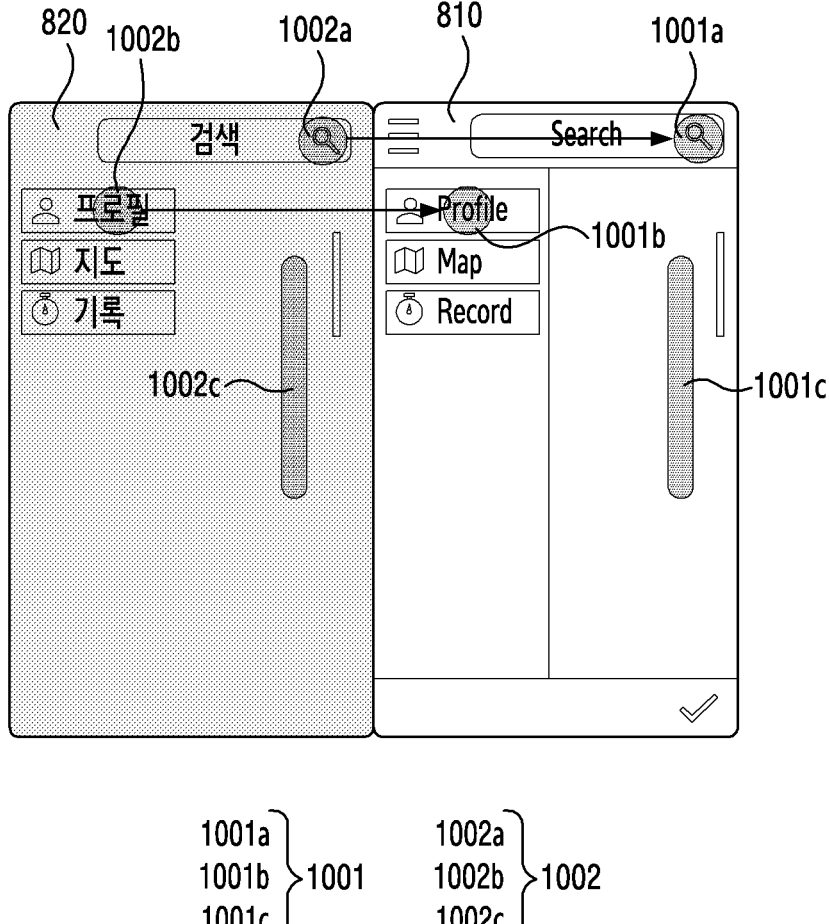
FIG. 10A is a diagram illustrating transferring an event to a first application in case of arranging and displaying layouts indicating an execution screen of the first application and a translation result in parallel in an electronic device according to an embodiment of the disclosure.
Figure 10B:
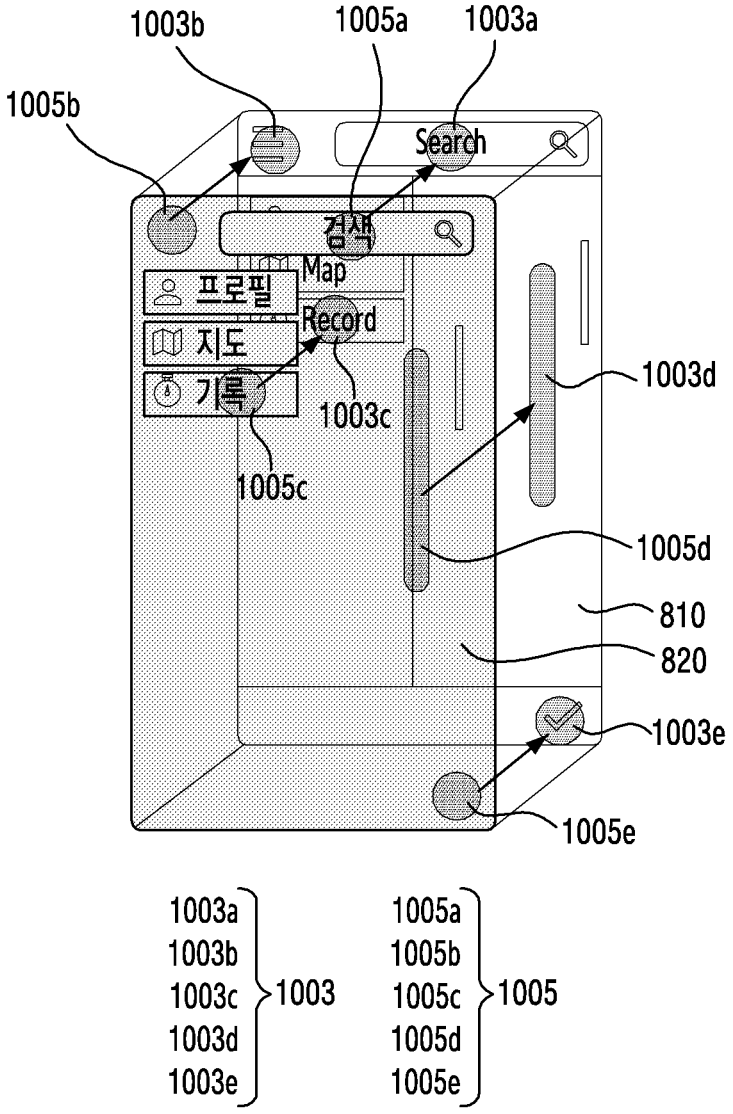
FIG. 10B is a diagram illustrating transferring an event to a first application in case of arranging and displaying layouts indicating an execution screen of the first application and a translation result superimposed in an electronic device according to an embodiment of the disclosure.

FIG. 10A is a diagram illustrating transferring an event to a first application in case of arranging and displaying layouts indicating an execution screen of the first application and a translation result in parallel in an electronic device according to an embodiment of the disclosure. FIG. 10B is a diagram illustrating transferring an event to a first application in case of arranging and displaying layouts indicating an execution screen of the first application and a translation result superimposed in an electronic device according to an embodiment of the disclosure.

Referring to FIG. 10A, a processor 210 according to an embodiment may arrange and display a first execution screen 810 of a first application in parallel with a second execution screen 820 acquired by translating the first execution screen 810 through a second application. A processor 210 according to an embodiment may transfer an event occurring in a second execution screen 820 to a first execution screen 810. According to an embodiment, areas 1002 included in the second execution screen 820 may correspond to areas 1001 included in the first execution screen. For example, a first area 1002*a*, a second area 1002*b*, and a third area 1002*c* included in the second execution screen 820 may correspond to a fourth area 1001*a*, a fifth area 1001*b*, and a sixth area 1001*c* included in the first execution screen 810, respectively.

According to an embodiment, the processor 210 may transfer a touch event received with respect to the first area 1002*a* and the second area 1002*b* included in the second execution screen 820 to the first application. According to an embodiment, the processor 210 may execute a function corresponding to the touch event transferred to the first application on the first application. According to an embodiment, the processor 210 may transfer a scroll event received with respect to the third area 1002*c* included in the second execution screen 820 to the first application. According to an embodiment, the processor 210 may execute a function corresponding to the scroll event transferred to the first application on the first application.

Referring to FIG. 10B, the processor 210 according to an embodiment may display the first execution screen 810 of the first application superimposed on the second execution screen 820 acquired by translating the first execution screen 810 through the second application. The processor 210 according to an embodiment may transfer an event occurring in the second execution screen 820 to the first execution screen 810. According to an embodiment, areas 1005 included in the second execution screen 820 may correspond to areas 1003 included in the first execution screen. For example, a first area 1005*a*, a second area 1005*b*, a third area 1005*c*, a fourth area 1005*d*, and a fifth area 1005*e* included in the second execution screen 820 may correspond to a sixth area 1003*a*, a seventh area 1003*b*, an eighth area 1003*c*, a ninth area 1003*d*, and a tenth area 1003*e* included in the first execution screen 810, respectively.

According to an embodiment, the processor 210 may transfer a touch event received with respect to the first area 1005*a*, the second area 1005*b*, the third area 1005*c*, and the fifth area 1005*e* included in the second execution screen 820 to the first application. According to an embodiment, the processor 210 may execute a function corresponding to the touch event transferred to the first application on the first application. According to an embodiment, the processor 210 may transfer a scroll event received with respect to the fourth area 1005*d* included in the second execution screen 820 to the first application. According to an embodiment, the processor 210 may execute a function corresponding to the scroll event transferred to the first application on the first application.

According to the embodiment described above, the processor 210 may detect a scroll and touch event with respect to the second execution screen 820 to detect in advance that a screen is to be changed and adjust a summon frequency of an OCR engine and translation engine to optimize translation performance.

Figure 11:
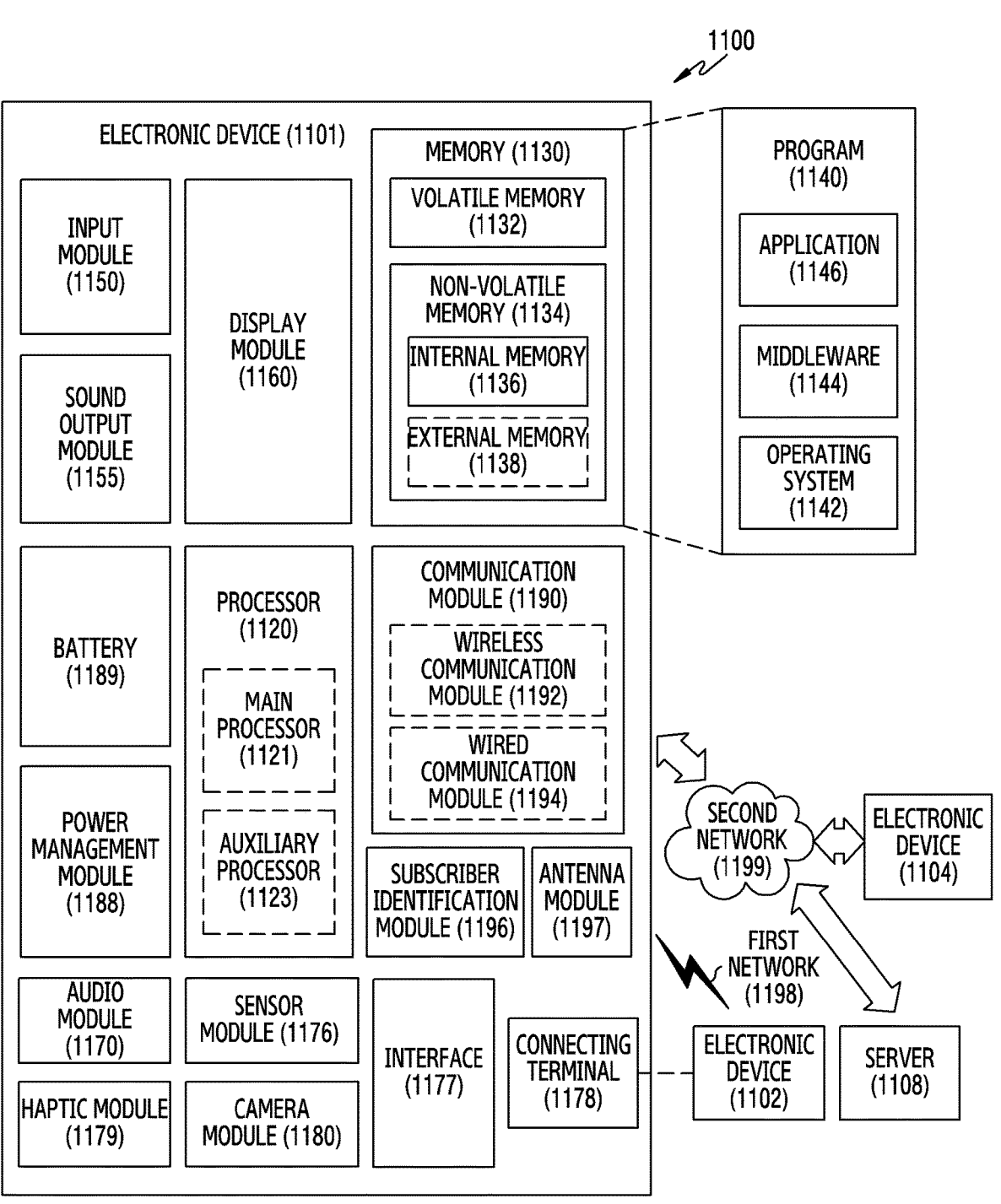
FIG. 11 is a block diagram illustrating an electronic device in a network environment according to an embodiment of the disclosure.

FIG. 11 is a block diagram illustrating an electronic device 1101 in a network environment 1100 according to an embodiment of the disclosure.

Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thererto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5$^{th}$ generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 1164 dB or less) for implementing mMTC, or U-plane latency (e.g., 0.5 ms or less for each of downlink (DL) and uplink (UL), or a round trip of 11 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the elec-tronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numer-als may be used to refer to similar or related elements. It is to be understood that a singular form of a noun correspond-ing to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "com-municatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit imple-mented in hardware, software, or firmware, and may inter-changeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be imple-mented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the stor-age medium and where the data is temporarily stored in the storage medium.

According to an embodiment, a method according to various embodiments of the disclosure may be included and provided in a computer program product. The computer program product may be traded as a product between a seller and a buyer. The computer program product may be distrib-uted in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be tempo-rarily generated or at least temporarily stored in the machine-readable storage medium, such as memory of the manufacturer's server, a server of the application store, or a relay server.

According to various embodiments, each component (e.g., a module or a program) of the above-described com-ponents may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodi-ments, the integrated component may still perform one or more functions of each of the plurality of components in the same or similar manner as they are performed by a corre-sponding one of the plurality of components before the integration. According to various embodiments, operations performed by the module, the program, or another compo-nent may be carried out sequentially, in parallel, repeatedly, or heuristically, or one or more of the operations may be executed in a different order or omitted, or one or more other operations may be added.

As described above, an electronic device (e.g., the elec-tronic device 100 in FIG. 1) according to an embodiment may include a display (e.g., the display 220 in FIG. 2) and at least one processor (e.g., the processor 210 in FIG. 2) electrically connected to the display, wherein the at least one processor is configured to execute a first application based on a first language, display a first execution screen corre-sponding to the first application on the display, wherein a content, which changes after a specified time elapses from a time point at which the first application is executed, is displayed in a first area of the first execution screen, receive a first user input that is for executing a second application, execute the second application in response to receiving the first user input, translate a text included in the first execution screen from the first language to a second language using the second application and displays the translation on the dis-play, extract the text included in the changed content in a state, in which the second application is executed and in response to the content in the first area being changed, translate the extracted text from the first language to the second language using the second application, and display a second execution screen corresponding to the first execution screen on the display based on the second language.

According to an embodiment, the content may include at least one of an image or text, and the change of the content may include deletion or change of at least one of the image or text.

According to an embodiment, the at least one processor may acquire information on at least one of a size of the first execution screen or a location of at least one UI included in the first execution screen and generate the second execution screen corresponding to the first execution screen by using the acquired information.

According to an embodiment, the at least one processor may identify a category of the first application and translate the extracted text extracted from the first language to the second language based on the identified category.

According to an embodiment, the at least one processor may acquire attribute information on the extracted text, and generate the second execution screen based on the acquired attribute information.

According to an embodiment, the attribute information may include at least one of a font, a font color, a character spacing, a line spacing, a location, or a size of the extracted text and information on a peripheral image of the extracted text.

According to an embodiment, the second execution screen may be displayed in parallel with or superimposed on the first execution screen on the display.

According to an embodiment, the at least one processor may receive a second user input that is made with respect to the second execution screen, transfer an event related to the received second user input to the first application, and execute a function corresponding to the transferred event on the first application.

As described above, a method performed by an electronic device (e.g., the electronic device 100 in FIG. 1) according to an embodiment may include an operation of executing a first application based on a first language, an operation of displaying a first execution screen corresponding to the first application on a display of the electronic device, wherein a content, which changes after a specified time elapses from a time point the first application is executed, is displayed in a first area of the first execution screen, an operation of receiving a first user input that is for executing a second application, an operation of executing the second application in response to receiving the first user input, an operation of translating a text included in the first execution screen from the first language to a second language using the second application and displaying the translation on the display, an operation of extracting the text included in the changed content in a state, in which the second application is executed and in response to the content in the first area being changed, an operation of translating the extracted text from the first language to the second language using the second application, and an operation of displaying a second execution screen corresponding to the first execution screen on the display based on the second language.

According to an embodiment, the content may include at least one of an image or text, and the change of the content may include deletion or change of at least one of the image or text.

According to an embodiment, the method of the electronic device may include an operation of acquiring information on at least one of a size of the first execution screen or a location of at least one UI included in the first execution screen and an operation of generating the second execution screen corresponding to the first execution screen by using the acquired information.

According to an embodiment, the method of the electronic device may include an operation of identifying a category of the first application and an operation of translating the extracted text from the first language to the second language based on the identified category.

According to an embodiment, the method of the electronic device may include an operation of acquiring attribute information on the extracted text, and an operation of generating the second execution screen based on the acquired attribute information.

According to an embodiment, the second execution screen may be displayed in parallel with or superimposed on the first execution screen on the display.

According to an embodiment, the method of the electronic device may include an operation of receiving a second user input that is made with respect to the second execution screen, an operation of transferring an event related to the received second user input to the first application, and an operation of executing a function corresponding to the transferred event on the first application.

As described above, an electronic device (e.g., the electronic device 100 in FIG. 1) according to an embodiment may include a memory (e.g., the memory 230 in FIG. 2) for storing a first application and a second application, a communication circuit (e.g., the communication circuit 240 in FIG. 2), a display (e.g., the display 220 in FIG. 2), and at least one processor (e.g., the processor 210 in FIG. 2) connected to the memory, the communication circuit, and the display, wherein the at least one processor executes the first application based on a first language, displays a first execution screen of the first application in a first layout on the display, a first content acquired from the memory being disposed on a first area of the first layout, a second content acquired from the outside through the communication circuit being disposed on a second area of the first layout, acquires an event related to the second application for translating the first language into a second language, analyzes the first application stored in the memory by using the second application and translates the first content into the second language so as to acquire a first translation content, translates the second content acquired from the outside into the second language to acquire a second translation content, generates a second execution screen which has the first layout and in which the first translation content is disposed on the first area of the first layout and the second translation content is disposed on the second area of the first layout, and displays the second execution screen on the display. According to an embodiment, the at least one processor may acquire information on at least one of a size of the first layout and locations of the first content and the second content, and generate the second execution screen by using the acquired information.

According to an embodiment, the at least one processor may identify a category of the first application and acquire at least one of the first translated content and the second translated content based on the identified category.

According to an embodiment, the at least one processor may display the second execution screen in parallel with or superimposed on the first execution screen on the display.

According to an embodiment, the at least one processor may receive a user input with respect to the second execution screen, transfer an event related to the received user input to the first application, and execute a function corresponding to the transferred event on the first application.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display;

memory, comprising one or more storage media, storing instructions; and at least one processor, wherein the instructions, when executed by the at least one processor individually or collectively, cause the electronic device to:

execute a first application based on a first language, display a first execution screen corresponding to the first application on the display, wherein a content, which changes after a specified time elapses from a time point at which the first application is executed, is displayed in on a first area of the first execution screen, receive a first user input that is for executing a second application, execute the second application in response to receiving the first user input, translate a first text included in the first execution screen from the first language to a second language using the second application and display the translation on the display, extract a second text included in the changed content in a state, in which the second application is executed and in response to the content in the first area being changed, translate the second text from the first language to the second language by using a category of the first application and the second application, display a second execution screen corresponding to the first execution screen on the display based on the second language, wherein the translated second text, in the changed content, is displayed on a second area of the second execution screen, and in response to a second user input for the second area of the second execution screen, transfer an event related to the second user input to the first application so that a function corresponding to the event is executed via the first application.

2. The electronic device of claim 1, wherein the content includes at least one of an image or text, and wherein the change of the content includes deletion or change of at least one of the image or text.

3. The electronic device of claim 1, wherein the instructions that, when executed by the at least one processor individually or collectively, further cause the electronic device to:

acquire information on at least one of a size of the first execution screen or a location of at least one user interface (UI) included in the first execution screen, and generate the second execution screen corresponding to the first execution screen by using the acquired information.

4. The electronic device of claim 1, wherein the instructions that, when executed by the at least one processor individually or collectively, further cause the electronic device to:

acquire attribute information on the second text, and generate the second execution screen based on the acquired attribute information.

5. The electronic device of claim 4, wherein the attribute information comprises at least one of a font, a font color, a character spacing, a line spacing, a location, or a size of the second text and information on a peripheral image of the second text.

6. The electronic device of claim 1, wherein the second execution screen is displayed in parallel with, or superimposed on, the first execution screen on the display.

7. The electronic device of claim 1, wherein the instructions that, when executed by the at least one processor individually or collectively, further cause the electronic device to:

detect that the event corresponds to at least one of a scroll event or a page movement event to change the second execution screen.

8. The electronic device of claim 7, wherein the instructions that, when executed by the at least one processor individually or collectively, further cause the electronic device to:

in case that change amount of the second execution screen is less than or equal to a threshold value, extract texts of the changed second execution screen via the first application;

translate only a third text of the texts excluding an overlapping text with the second text from the first language to the second language using the category of the first application and the second application; and display the changed second execution screen on the display based on the translated second text and the translated third text.

9. A method performed by an electronic device, the method comprising:

executing a first application based on a first language;

displaying a first execution screen corresponding to the first application on a display of the electronic device, wherein a content, which changes after a specified time elapses from a time point at which the first application is executed, is displayed in-on a first area of the first execution screen;

receiving a first user input that is for executing a second application;

executing the second application in response to receiving the first user input;

translating a first text included in the first execution screen from the first language to a second language by using the second application and displaying the translation on the display;

extracting a second text included in the changed content in a state, in which the second application is executed and in response to the content in the first area being changed;

translating second text from the first language to the second language using a category of the first application and the second application; and displaying a second execution screen corresponding to the first execution screen on the display based on the second language, wherein the translated second text, in the changed content, is displayed on a second area of the second execution screen; and in response to a second user input for the second area of the second execution screen, transferring an event related to the second user input to the first application so that a function corresponding to the event is executed by the first application.

10. The method of claim 9, wherein the content includes at least one of an image or text, and wherein the change of the content includes deletion or change of at least one of the image or text.

11. The method of claim 9, further comprising:

acquiring information on at least one of a size of the first execution screen or a location of at least one user interface (UI) included in the first execution screen; and generating the second execution screen corresponding to the first execution screen by using the acquired information.

12. The method of claim 9, further comprising:

acquiring attribute information on the second text; and generating the second execution screen based on the acquired attribute information.

13. The method of claim 12, wherein the second execution screen is displayed in parallel with, or superimposed on, the first execution screen on the display.

14. The method of claim 9, further comprising:

detecting that the event corresponds to at least one of a scroll event or a page movement event to change the second execution screen.

15. The method of claim 12, wherein the attribute information comprises at least one of a font, a font color, a character spacing, a line spacing, a location, or a size of the second text and information on a peripheral image of the second text.

16. The method of claim 14, further comprising:

in case that change amount of the second execution screen is less than or equal to a threshold value, extracting texts of the changed second execution screen via the first application;

translating only a third text of the texts excluding an overlapping text with the second text from the first language to the second language using the category of the first application and the second application; and displaying the changed second execution screen on the display based on the translated second text and the translated third text.

\* \* \* \* \*